(12) United States Patent
Lynn et al.

(10) Patent No.: US 12,521,172 B2
(45) Date of Patent: Jan. 13, 2026

(54) ELECTROSURGICAL DEVICE

(71) Applicants: Smith & Nephew, Inc., Memphis, TN (US); Smith & Nephew Orthopaedics AG, Zug (CH)

(72) Inventors: Christopher J. Lynn, Austin, TX (US); Johnson E. Goode, Austin, TX (US)

(73) Assignees: Smith & Nephew, Inc., Memphis, TN (US); Smith & Nephew Orthopaedics AG, Zug (CH)

( * ) Notice: Subject to any disclaimer, the term of this patent is extended or adjusted under 35 U.S.C. 154(b) by 608 days.

(21) Appl. No.: 17/923,698

(22) PCT Filed: May 6, 2021

(86) PCT No.: PCT/US2021/031100
§ 371 (c)(1),
(2) Date: Nov. 7, 2022

(87) PCT Pub. No.: WO2021/226340
PCT Pub. Date: Nov. 11, 2021

(65) Prior Publication Data
US 2023/0200891 A1    Jun. 29, 2023

Related U.S. Application Data

(60) Provisional application No. 63/020,852, filed on May 6, 2020.

(51) Int. Cl.
*A61B 18/14*    (2006.01)
*A61B 18/00*    (2006.01)

(52) U.S. Cl.
CPC .. *A61B 18/148* (2013.01); *A61B 2018/00083* (2013.01)

(58) Field of Classification Search
CPC ... A61B 18/148; A61B 18/1485; A61B 18/14; A61B 18/1482; A61B 2018/00577;
(Continued)

(56) References Cited

U.S. PATENT DOCUMENTS

| | | | |
|---|---|---|---|
| 7,241,293 B2 * | 7/2007 | Davison | A61B 18/1402 604/35 |
| 7,727,232 B1 * | 6/2010 | Maurer | A61B 18/1402 606/50 |

(Continued)

FOREIGN PATENT DOCUMENTS

WO    2018213465 A1    11/2018

*Primary Examiner* — Thomas A Giuliani
(74) *Attorney, Agent, or Firm* — Kate Ryland Tetzlaff; Norman F. Hainer, Jr.

(57) ABSTRACT

Disclosed herein is an electrosurgical device including a handle at a proximal end and an elongate shaft coupled to the handle and extending distally from the handle. The device also includes a distal working end, including a return electrode and an active electrode supported by an insulative spacer, the insulative spacer separating the return and active electrode. The active electrode has a planar surface that is distal facing and defines a maximum planar surface length. The insulative spacer is generally tapered between the return electrode and active electrode. The insulative spacer has a planar stabilizing surface on a device first side that has a length that extends along the longitudinal axis, extending from a distal-most end of the return electrode to a leading edge surface of the active electrode. This length is at least as long as the maximum planar surface length.

20 Claims, 5 Drawing Sheets

(58) Field of Classification Search
CPC .... A61B 2018/00601; A61B 2018/126; A61B 2018/1412; A61B 2018/147; A61B 2018/1472; A61B 2018/162; A61B 2218/002; A61B 2218/007
USPC .......... 606/41, 49, 50; 607/98, 99, 101, 113, 607/115, 116
See application file for complete search history.

(56) References Cited

U.S. PATENT DOCUMENTS

| | | | |
|---|---|---|---|
| 9,456,865 B2 * | 10/2016 | Woloszko | A61B 18/148 |
| 2007/0179495 A1 * | 8/2007 | Mitchell | A61B 18/1482 |
| | | | 606/41 |
| 2008/0234673 A1 * | 9/2008 | Marion | A61B 18/1482 |
| | | | 606/41 |
| 2015/0245862 A1 * | 9/2015 | Goode | A61B 18/148 |
| | | | 606/41 |
| 2017/0290619 A1 * | 10/2017 | Woloszko | A61B 18/14 |

\* cited by examiner

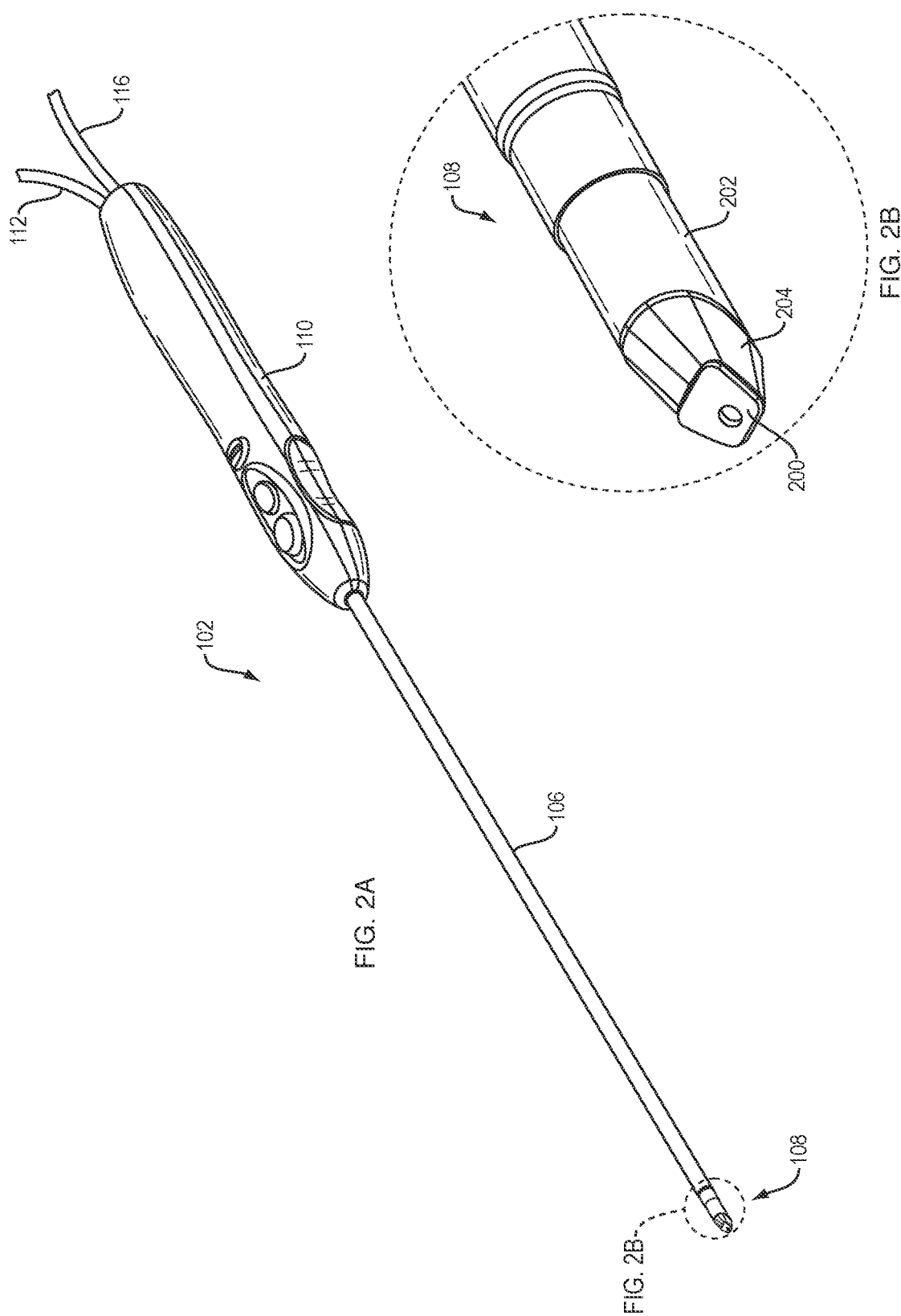

ELECTROSURGICAL DEVICE

CROSS-REFERENCE TO RELATED APPLICATIONS

This application is the U.S. national phase entry under 35 U.S.C. § 371 of International Application No. PCT/US2021/031100, filed May 6, 2021, entitled "ELECTROSURGICAL DEVICE," which claims benefit to U.S. Provisional Patent Application No. 63/020,852; filed May 6, 2020, titled "ELECTROSURGICAL DEVICE" and are incorporated by reference in their entirety.

FIELD

The present invention relates generally to the field of electrosurgery, and more particularly to apparatus and methods for applying high frequency voltage to treat tissue.

BACKGROUND

Electrosurgical systems are used during surgical procedures to remove several different tissue types. For example, procedures involving the hip, knee or shoulder may require removing portions of cartilage, meniscus, and free floating and/or trapped tissue. In some cases, the removal may be a very slight removal, such as tissue sculpting, and in other cases, removal that is more aggressive or debulking of tissue is used. In some cases, the removal may be performed arthroscopically.

SUMMARY

Described herein are various improvements in methods and devices for electrosurgically treating tissue.

A first example embodiment of an electrosurgical device is disclosed herein including a handle at a proximal end of the device, an elongate shaft extending distally from the handle and a longitudinal axis extending along the shaft. The elongate shaft may have an angular offset towards a distal end, or may be steerable or bendable to alter the angular offset during the procedure. The distal end includes a return electrode, an active electrode and an electrically insulative spacer axially separating the return and active electrode. The active electrode resides along a single plane and defines a planar surface that is distal facing. The planar surface is angled at a non-orthogonal angle relative to the longitudinal axis at the distal end. The planar surface is angled relative to the longitudinal axis to define a linear leading edge of the active electrode that has a lateral extent and defines a distal-most edge of the electrosurgical device. The insulative spacer is tapered between the return electrode and active electrode. The insulative spacer includes a first planar surface that extends along the longitudinal axis and across an extent of the insulative spacer on a first side of the electrosurgical device distal end that also includes the active electrode linear leading edge.

In some example embodiments, the active electrode planar surface may define a planar surface length that extends from the leading edge to an opposing rear edge. The first planar surface of the insulative spacer has a first length extending from the return electrode to a leading edge of the insulative spacer, and the first length may be at least as long as the planar surface length of the active electrode. In some embodiments, the planar surface of the active electrode is oriented at an acute angle relative to the first planar surface of the spacer, the acute angle extending through the spacer.

In some embodiments, the first planar surface is configured to guide the active electrode leading edge onto a first tissue, while angling a remaining portion of the planar surface of the active electrode away from the first tissue. In some embodiments, the insulative spacer defines a second planar surface, on an opposite side of the device to the first planar surface, the second planar surface axially longer than the first planar surface. In some embodiments, the insulative spacer defines a multi-faceted outer surface, including at least the first planar surface, a second planar surface and a plurality of curved surfaces separating the first and second planar surfaces. In some embodiments, the insulative spacer is asymmetrically tapered between the first side and an opposing second side of the insulative spacer, the opposing second side having a greater taper angle than the first side. In some embodiments, the active electrode planar surface defines a trapezoidal shaped boundary. In some embodiments, the spacer defines a distal-most surface that is congruent with the active electrode planar surface.

Another example device embodiment is disclosed that includes a handle at a proximal end, an elongate shaft extending distally from the handle along a longitudinal axis and a distal end. The distal end includes a return electrode, an active electrode and an electrically insulative spacer axially separating the return and active electrode. The active electrode defines a planar surface that is distal facing and angled relative to the longitudinal axis to define a leading edge of the active electrode defining a distal-most edge of the distal end. The insulative spacer is tapered between the return electrode and active electrode. The insulative spacer defines a first planar surface that extends proximally from a leading edge of the insulative spacer that is directly adjacent the leading edge of the active electrode. The first planar surface extends proximally along the device longitudinal axis and extends laterally across the insulative spacer. The first planar surface is configured to engage a first tissue and stabilize an orientation of the active electrode leading edge relative to a target tissue.

In some embodiments, the active electrode defines a major planar surface length and the first planar surface of the insulative spacer has a linear length that is at least as long as the major planar surface length. The linear length may be defined as a length that extends along the longitudinal axis. In some embodiments, the planar surface of the active electrode is oriented at an acute angle relative to the first planar surface of the insulative spacer, the acute angle extending through the spacer. In some embodiments, the insulative spacer defines a second planar surface, on an opposite side of the electrosurgical device to the first planar surface. The second planar surface may be axially longer than the first planar surface. In some embodiments, the insulative spacer defines a multi-faceted outer surface, including at least the first planar surface and a second planar surface. In some embodiments, the insulative spacer may be asymmetrically tapered between the first side and an opposing second side of the insulative spacer, the opposing second side having a greater angle of taper than the first side. In some embodiments, the active electrode planar surface defines a trapezoidal shaped boundary. In some embodiments, the insulative spacer defines a distal-most surface that is distal facing and congruent with the active electrode planar surface.

An example method of treating a target tissue with an electrosurgical device is also disclosed including engaging a substantial portion of a planar surface of an insulative spacer of the electrosurgical device on a first tissue. The active electrode of the device is then moved towards a target tissue while maintaining engagement of the planar surface on the first tissue. The spacer planar surface may be oriented relative to the active electrode to preferentially place an active electrode leading edge on the target tissue, while angling a planar surface of the active electrode away from the target tissue. The leading edge of the active electrode may then move along the target tissue while applying electrosurgical energy to treat the target tissue while maintaining engagement of the planar surface on the first tissue.

In some example methods, the planar surface is configured to define an inert side of the device, such that moving the leading edge of the active electrode along the target tissue while applying electrosurgical energy treats the target tissue while shielding the first tissue from the electrosurgical energy. Some example methods may also include adjusting the orientation of the device to engage a substantial portion of the active electrode planar surface with a second tissue while viewing a rear edge surface of the active electrode. Applying electrosurgical energy while in this adjusted orientation may then debulk the second tissue. The insulative spacer defines a tapered surface extending from a rear edge surface of the active electrode, the tapered surface configured to provide visibility of the rear edge surface while the debulking the second tissue.

These and other features and advantages will be apparent from a reading of the following detailed description and a review of the associated drawings. It is to be understood that both the foregoing general description and the following detailed description are explanatory only and are not restrictive of aspects as claimed.

Definitions

Various terms are used to refer to particular system components. Different companies may refer to a component by different names— this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

Reference to a singular item includes the possibility that there are plural of the same items present. More specifically, as used herein and in the appended claims, the singular forms "a," "an," "said" and "the" include plural references unless the context clearly dictates otherwise. It is further noted that the claims may be drafted to exclude any optional element. As such, this statement serves as antecedent basis for use of such exclusive terminology as "solely," "only" and the like in connection with the recitation of claim elements, or use of a "negative" limitation. Lastly, it is to be appreciated that unless defined otherwise, all technical and scientific terms used herein have the same meaning as commonly understood by one of ordinary skill in the art to which this invention belongs.

"Ablation" shall mean removal of tissue based on tissue interaction with plasma.

"Plasma" shall mean a low temperature gas formed of vapor bubbles or a vapor layer that is capable of emitting an ionized discharge.

"Active electrode" shall mean an electrode of an electrosurgical device which produces an electrically-induced tissue-altering effect when brought into contact with, or close proximity to, a tissue targeted for treatment.

"Return electrode" shall mean an electrode of an electrosurgical device which serves to provide a current flow path for electrical charges with respect to an active electrode, and/or an electrode of an electrical surgical device which does not itself produce an electrically-induced tissue-altering effect on tissue targeted for treatment.

Where a range of values is provided, it is understood that every intervening value, between the upper and lower limit of that range and any other stated or intervening value in that stated range is encompassed within the invention. In addition, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

BRIEF DESCRIPTION OF THE DRAWINGS

The disclosure will be more fully understood by reference to the detailed description, in conjunction with the following figures, wherein:

FIGS. 2A and 2B illustrate an electrosurgical device in accordance with this disclosure;

DETAILED DESCRIPTION

Figure 1:
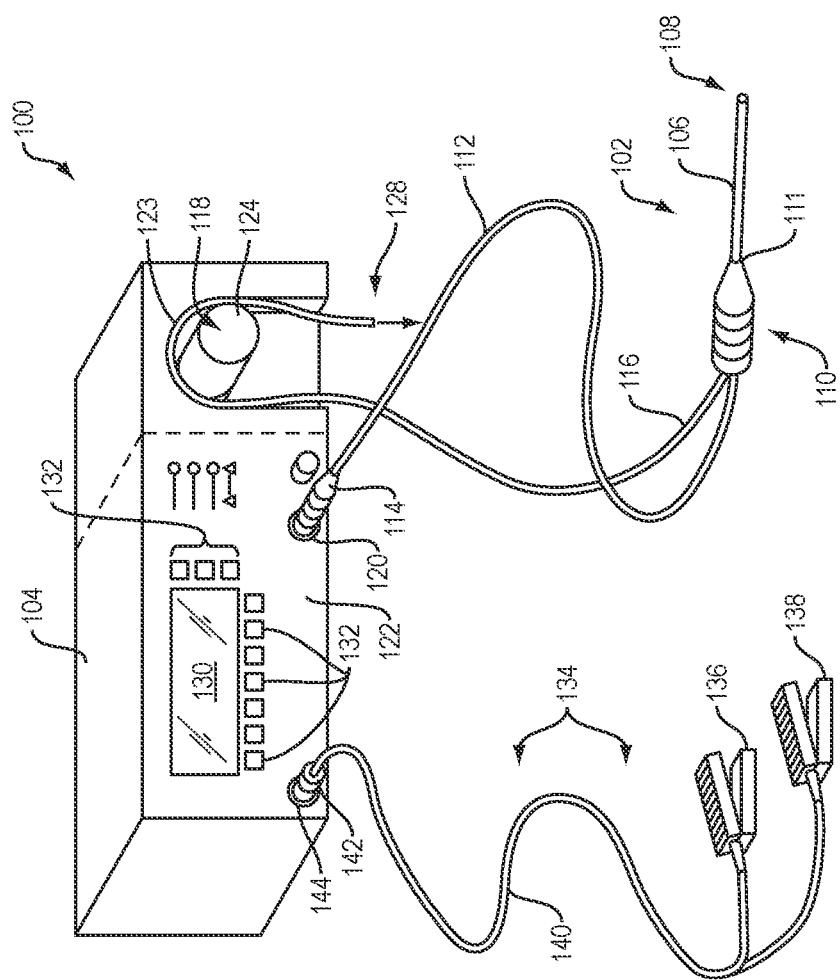
FIG. 1 illustrates an electrosurgical system in accordance with this disclosure.

In the description that follows, like components have been given the same reference numerals, regardless of whether they are shown in different examples. To illustrate example (s) in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

As used in the specification and claims, for the purposes of describing and defining the invention, the terms "about" and "substantially" are used to represent the inherent degree of uncertainty that may be attributed to any quantitative comparison, value, measurement, or other representation.

The terms "about" and "substantially" are also used herein to represent the degree by which a quantitative representation may vary from a stated reference without resulting in a change in the basic function of the subject matter at issue. "Comprise," "include," and/or plural forms of each are open ended and include the listed parts and can include additional parts that are not listed. "And/or" is open-ended and includes one or more of the listed parts and combinations of the listed parts. Use of the terms "upper," "lower," "upwards," and the like is intended only to help in the clear description of the present disclosure and are not intended to limit the structure, positioning and/or operation of the disclosure in any manner.

This disclosure pertains to an electrosurgical device or wand that may be used to treat tissue during an arthroscopic procedure. For example, this device may be used to treat tissue within a shoulder, knee or hip joint. Access to target tissues is preferably through a port, into a fluid filled cavity and therefore the device disclosed includes a small diameter shaft for insertion through this port or ports. Treatment may include finely sculpting or dissecting a portion of the target tissue using high frequency energy while the device is in a first orientation relative to a target tissue. Treatment of the tissue may also include debulking or removing larger volumes of a tissue while the device is in a second orientation relative to a target tissue. The device is electrically coupled to a high frequency energy supply. The device may also be coupled to a fluid flow rate control means. Fluid and debris may be removed from the target area via at least one aspiration port through the device, and the fluid flow rate control means may influence or at least partially control the mode of tissue treatment. Different modes and their associated fluid aspiration rate control philosophies are disclosed in commonly owned U.S. Pat. Nos. 9,333,024 and 9,713,489, herein incorporated by reference in their entirety.

Electrosurgical device may include a rigid shaft and thereby have a fixed angular offset between the device shaft proximal end relative to the device distal end. In other embodiments, the electrosurgical device may include an adjustable angular offset. For example, the shaft may be malleable in that a user may plastically deform a portion of the shaft to adjust the angular offset. Since this may frustrate access through the small ports into the joint space, this device may be steerable. Device shaft may include actuation rods or cables for example that elastically deform a spine along the shaft, such that the angular offset may be adjusted after insertion through the port. Example devices with steerable shafts are disclosed in commonly owned Provisional Patent Application Nos. 62/962,036 and international patent application no. PCT/US2021/013811, titled "ARTICULATING SHAFT OF A SURGICAL DEVICE" herein incorporated by reference in their entirety This device may be configured for arthroscopic procedures in the hip joint. The hip joint presents unique challenges to arthroscopic devices in that it is both a very tight and deep area to access. Accessing the relevant anatomy to perform treatment can be difficult, which may influence the outcome of the treatment and the total time that the patient is in surgery. For example, one of the target areas in hip arthroscopy is the hip capsule that is attached to the acetabulum, which may need separating therefrom. This allows the surgeon to access the acetabular rim for anchor placement and treatment of the labrum. When separating the capsule from the acetabulum, minimizing tissue loss is very important, to preserve tissue. Therefore, separation is preferably limited to a specific and narrowly localized area where separation is desired. Tissue loss may occur by apply electrosurgical energy to tissue outside of this localized area. In such a tight and deep area, the degree of tissue loss is highly dependent on skilled surgeon technique.

This device includes surfaces and an active electrode configuration that improves ease of access to this target area, and provides a means for directing a more targeted and localized separation of the hip capsule from the acetabulum, relying less on surgeon technique.

FIG. 1 shows an electrosurgical system 100 in accordance with at least some embodiments. In particular, the electrosurgical system 100 comprises an electrosurgical device 102 or wand coupled to an electrosurgical controller 104 (hereinafter "controller 104"). The device 102 comprises an elongate shaft 106 that defines distal end 108. The elongate shaft 106 further defines a handle 110 at a proximal end 111, where a physician grips the device 102 during surgical procedures. The device 102 further comprises a flexible multi-conductor cable 112 housing one or more electrical leads (not specifically shown in FIG. 1), and the flexible multi-conductor cable 112 terminates in a device connector 114. As shown in FIG. 1, the device 102 couples to the controller 104, such as by a controller connector 120 on an outer surface of the enclosure 122 (in the illustrative case of FIG. 1, the front surface).

Though not visible in the view of FIG. 1, in some embodiments, the device 102 has one or more internal fluid conduits coupled to externally accessible tubular members. As illustrated, the device 102 has a flexible tubular member 116, used to provide aspiration at the distal end 108 of the device. In accordance with various embodiments, the tubular member 116 couples to a peristaltic pump 118, which peristaltic pump 118 is illustratively shown as an integral component with the controller 104 (i.e., residing at least partially within the enclosure 122 of the controller 104). In other embodiments, an enclosure for the peristaltic pump 118 may be separate from the enclosure 122 for the controller 104 (as shown by dashed lines in FIG. 1), but in any event the peristaltic pump is operatively coupled to the controller 104. In yet still further embodiments, suction for aspiration may be provided from any suitable source, such as suction outlets available in hospital settings. The example peristaltic pump 118 comprises a rotor portion 124 (hereafter just "rotor 124") as well as a stator portion 126 (hereafter just "stator 126"). The example flexible tubular member 116 couples within the peristaltic pump 118 between the rotor 124 and the stator 126, and movement of the rotor 124 against the flexible tubular member 116 causes fluid movement toward the discharge 128.

Still referring to FIG. 1, a display device or interface device 130 is visible through the enclosure 122 of the controller 104, and in some embodiments, a user may select operational characteristics of the controller 104 by way of the interface device 130 and related buttons 132. For example, using one or more of the buttons 132 the surgeon may select among energy ranges or modes for use with the device 102 during electrosurgical procedures.

In some embodiments, the electrosurgical system 100 also comprises a foot pedal assembly 134. The foot pedal assembly 134 may comprise one or more pedal devices 136 and 138, a flexible multi-conductor cable 140 and a pedal connector 142. While only two pedal devices 136 and 138 are shown, one or more pedal devices may be implemented. The enclosure 122 of the controller 104 may comprise a corresponding connector 144 that couples to the pedal connector 142. A physician may use the foot pedal assembly 134 to control various aspects of the controller 104, such as the mode of ablation. For example, pedal device 136 may be used for on-off control of the application of radio frequency (RF) energy to the device 102. Further, pedal device 138 may be used to control and/or set the mode of operation of the electrosurgical system. For example, actuation of pedal device 138 may switch between ablation mode and coagulation mode.

The electrosurgical system 100 of the various embodiments implements ablation, which employs Coblation® technology. In particular, the assignee of the present disclosure is the owner of Coblation® technology. Coblation® technology involves the application of a radio frequency (RF) signal between one or more active electrodes and one or more return electrodes of the device 102 to develop high electric field intensities in the vicinity of the target tissue. The electric field intensities may be sufficient to vaporize an electrically conductive fluid over at least a portion of the one or more active electrodes in the region between the one or more active electrodes and the target tissue. The electrically conductive fluid may be inherently present in the body, such as blood, or in some cases extracellular or intracellular fluid. In other embodiments, the electrically conductive fluid may be a liquid or gas, such as isotonic saline. In some embodiments, such as arthroscopic surgical procedures involving a joint of the knee, hip or shoulder, the electrically conductive fluid is delivered near the active electrode and/or to the target site by a delivery system separate and apart from the system 100. This fluid may be present to distend the joint for easier access to target tissues.

When the electrically conductive fluid is heated to the point that the atoms of the fluid vaporize faster than the atoms recondense, a gas is formed. When sufficient energy is applied to the gas, the atoms collide with each other causing a release of electrons in the process, and an ionized gas or plasma is formed (the so-called "fourth state of matter"). Stated otherwise, plasmas may be formed by heating a gas and ionizing the gas by driving an electric current through the gas, or by directing electromagnetic waves into the gas. The methods of plasma formation give energy to free electrons in the plasma directly, electron-atom collisions liberate more electrons, and the process cascades until the desired degree of ionization is achieved. A more complete description of plasma can be found in Plasma Physics, by R. J. Goldston and P. H. Rutherford of the Plasma Physics Laboratory of Princeton University (1995), the complete disclosure of which is incorporated herein by reference.

As the density of the plasma becomes sufficiently low (i.e., less than approximately 1020 atoms/cm3 for aqueous solutions), the electron mean free path increases such that subsequently injected electrons cause impact ionization within the plasma. When the ionic particles in the plasma layer have sufficient energy (e.g., 3.5 electron-Volt (eV) to 5 eV), collisions of the ionic particles with molecules that make up the target tissue break molecular bonds of the target tissue, dissociating molecules into free radicals which then combine into gaseous or liquid species. By means of the molecular dissociation (as opposed to thermal evaporation or carbonization), the target tissue is volumetrically removed through molecular dissociation of larger organic molecules into smaller molecules and/or atoms, such as hydrogen, oxygen, oxides of carbon, hydrocarbons and nitrogen compounds. The molecular dissociation completely removes the tissue structure, as opposed to dehydrating the tissue material by the removal of liquid within the cells of the tissue and extracellular fluids, as occurs in related art electrosurgical desiccation and vaporization. A more detailed description of the molecular dissociation can be found in commonly assigned U.S. Pat. No. 5,697,882 the complete disclosure of which is incorporated herein by reference.

The energy density produced by electrosurgical system 100 at the distal end 108 of the device 102 may be varied by adjusting a variety of factors, such as: the number of active electrodes; electrode size and spacing; electrode surface area; asperities and/or sharp edges on the electrode surfaces; electrode materials; applied voltage; current limiting of one or more electrodes (e.g., by placing an inductor in series with an electrode); electrical conductivity of the fluid in contact with the electrodes; density of the conductive fluid; and other factors. Accordingly, these factors can be manipulated to control the energy level of the excited electrons. Since different tissue structures have different molecular bonds, the electrosurgical system 100 may be configured to produce energy sufficient to break the molecular bonds of certain tissue but insufficient to break the molecular bonds of other tissue. For example, fatty tissue (e.g., adipose) has double bonds that require an energy level higher than 4 eV to 5 eV (i.e., on the order of about 8 eV) to break. Accordingly, the Coblation® technology in some modes of operation does not ablate such fatty tissue; however, the Coblation® technology at the lower energy levels may be used to effectively ablate cells to release the inner fat content in a liquid form. Other modes of operation may have increased energy such that the double bonds can also be broken in a similar fashion as the single bonds (e.g., increasing voltage or changing the electrode configuration to increase the current density at the electrodes). A more complete description of the various phenomena can be found in commonly assigned U.S. Pat. Nos. 6,355,032, 6,149,120 and 6,296,136, the complete disclosures of which are incorporated herein by reference.

FIG. 2 shows a perspective view of device 102, in accordance with example systems. The device 102 comprises elongate shaft 106, which may be flexible or rigid, and a handle 110 coupled to the proximal end 111 of the elongate shaft 106. At the distal end 108 resides an active electrode 200, a return electrode 202, and an insulative spacer (electrode support member) 204, as seen more clearly in the enlarged view portion. The relationship of the various elements at the distal end 108 of the device 102 will be discussed in greater below. Active electrode 200 may be coupled to an active or passive control network within controller 104 (FIG. 1) by means of one or more insulated electrical connectors (not shown) in the multi-conductor cable 112. The active electrode 200 is electrically isolated from a common or return electrode 202, which is disposed on the elongate shaft 106. Proximally from the distal tip, the return electrode 202 is concentric with the elongate shaft 106 of the device 102. The spacer 204 is positioned distal to the return electrode 202 and may be composed of an electrically insulating material such as epoxy, plastic, ceramic, silicone, glass or the like. Insulative support 204 extends from the distal end 108 of elongate shaft 106 (usually about 2 to 20 mm) and provides support for active electrode 200. Insulative spacer 204 defines an electrically insulative material, and is sufficient long (axially) to provide an electrically inert (non-conductive) portion of the device distal end 108. The insulative spacer 204 is configured to define, guide and stabilize an orientation of the active electrode 200 relative to a target tissue. The insulative spacer 204 is configured to space the return electrode 202 and active electrode 200 from each other. The active electrode 200, in collaboration with the spacer surfaces, is designed such that each edge may be used for precise dissection and sculpting of tissue, the orientation towards each edge guided by extended planar surfaces on insulative spacer surfaces. The device distal end 108 is configured to precisely dissect tissue while in a first orientation and debulk tissue while in a second orientation, different from the first orientation.

The device is configured to be used in an electrically conductive fluid, that may be present as part of the arthroscopic procedure to distend the joint. The electrosurgical energy may therefore use this electrically conductive fluid to bridge between the active 200 and return electrode 202. Tissue tends to have a slightly higher impedance than electrically conductive fluid, but lower impedance than the spacer 202. Therefore, spacer 202 in this device 102 is configured to be sufficiently long and space the active electrode 200 from return electrode 202 to preferentially direct most of the electrical energy through the electrically conductive fluid, even when the active and return electrode (200, 204) are in contact with tissue. That does not preclude any tissue effect or energy flowing from through the tissue; the spacing is configured to preferentially minimize the energy flowing through the tissue such that an electrically induced tissue-altering effect is avoided. The spacer 202 length is longer than many related art devices and defines an inert or shielded zone of the device, allowing the surgeon to engage and use surfaces of the spacer 202 while minimally altering the tissue it engages.

Figure 3A:
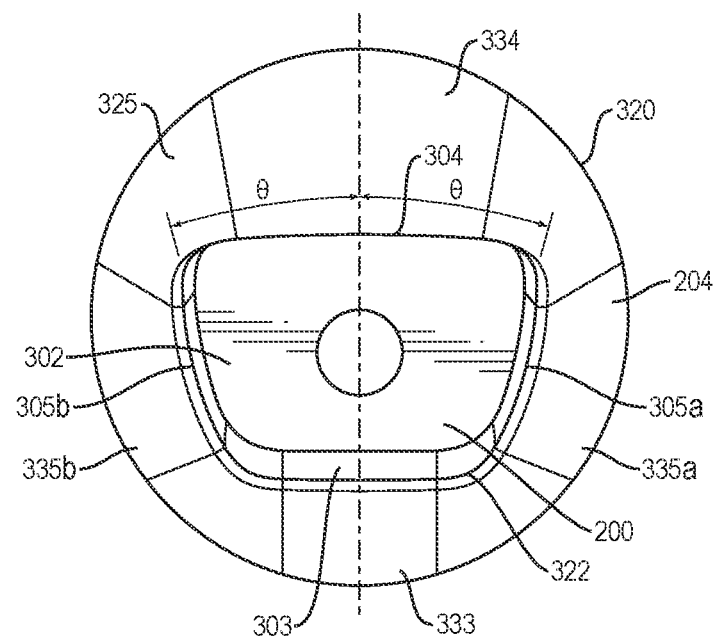
FIG. 3A illustrates an end view of the electrosurgical device in accordance with this disclosure.

FIG. 3A illustrates an end view of distal end 108. The handle 110 has been removed from FIG. 3A for simplification of the figure. Active electrode 200 generally defines a planar electrode that resides along a single plane, the plane oriented at an angle between 30-60 degrees relative to a longitudinal axis L-L of the distal end 108. Active electrode 200 defines a distal-most planar surface 302, having a polygonal shape. Planar surface 302 faces distally. As shown, the active electrode 200 defines a quadrilateral with four linear edges 303, 304, 305a, 305b linked by rounded apex. In use, the active electrode 200 may be oriented to place one of these four linear edges 303, 304, 305a, 305b directly adjacent a tissue to precisely dissect the tissue. Alternatively, the active electrode 200 may be oriented to place a substantial portion of the planar surface 302 in engagement with a target tissue to debulk the tissue. Planar surface 302 is orientated at an angle to the longitudinal axis of the distal end 108, defining a distal most edge (leading edge) 303 of the surface 302. Leading edge 303 may be linear across its extent and may be parallel to an opposing proximal-most edge 304 of the active electrode 202, defining a trapezoidal shaped face 303. Lateral side edges 305a, 305b extend between leading edge 303 and proximal-most edge 304, lateral side edges extending at equivalent and opposite angles θ to a central vertical axis along planar surface 203; θ being between 10-30 degrees (°).

Also shown in FIG. 3A, spacer 202 may define an outermost proximal boundary 320 of insulative spacer 204 that may define a circular boundary. Spacer 204 axially tapers, defining a distal-most surface 322, which defines a planar surface that is distally facing and parallel to active electrode surface 302. Spacer 204 tapers such that the outermost proximal boundary 320 of the support 204 is larger than the outermost distal boundary of the distal-most surface 322 of the support 204. Support member 204 outer surface defines a general conical shape, symmetrical through a vertical plane through the center of the support member 204 and parallel to the distal end longitudinal axis. Support member 204 outer surface is asymmetrical relative to a horizontal plane through the center of the support member and parallel to the distal end longitudinal axis. The taper angle is greater on the top side of the device than on the bottom side. A proximal most end of support member 204 may define a circular cross section or outer periphery. A distal-most surface 322 preferable defines a matching, or similar shape to the active electrode 202. For example, if the active electrode 202 defines a trapezoid, the distal most edge surface 322 may also define a trapezoid shaped surface. Active electrode 202 and distal-most surface 322 may be congruent, or nearly congruent.

Mirroring the shape of active electrode 202, outer surface 325 of spacer defines a plurality of planar segments that extend from corresponding linear edges 303, 304, 305a, 305b of active electrode 200. Spacer 204 defines an outer surface 325 that is conically tapered, formed by a plurality of planar surfaces or facets with curved apex portions therebetween. For example, a planar surface 333 extends proximally from the edge of surface 322 corresponding to or directly adjacent linear leading edge 303. Planar surface 333 is planar across its lateral extent that approximately corresponds to the linear lateral extent of edge 303. Similarly, planar surface 334 extends proximally from the edge surface of 322 corresponding to or directly adjacent linear edge surface 304 of active electrode 202, planar surface 334 also tapering to the larger outer peripheral boundary 320. Surface 334 may have a wider lateral extent than surface 333, also mirroring active electrode edge lengths. Lateral surfaces 335a, 335b also define planar surfaces in a similar fashion. The multi-faceted surface of support 204 is configured to define an orientation of the active electrode 200 during tissue dissection, as will be discussed more hereinafter.

An aperture 310 extends through the active electrode 108 and is in fluid communication with a fluid transport conduit construct. Fluid transport conduit construct includes a conduit defined by the support member 204 and tubing or lumens that extend along the device shaft 106, where it is fluidly coupled to tubing 116, as disclosed herein. Aperture 310 is sized to draw tissue debris, plasma by-product and fluid therethrough and into fluid transport conduit. As disclosed earlier, a rate of aspiration through aperture 310 may be controlled to at least partially influence or control the tissue effect mode at the active electrode 202.

Figure 3B:
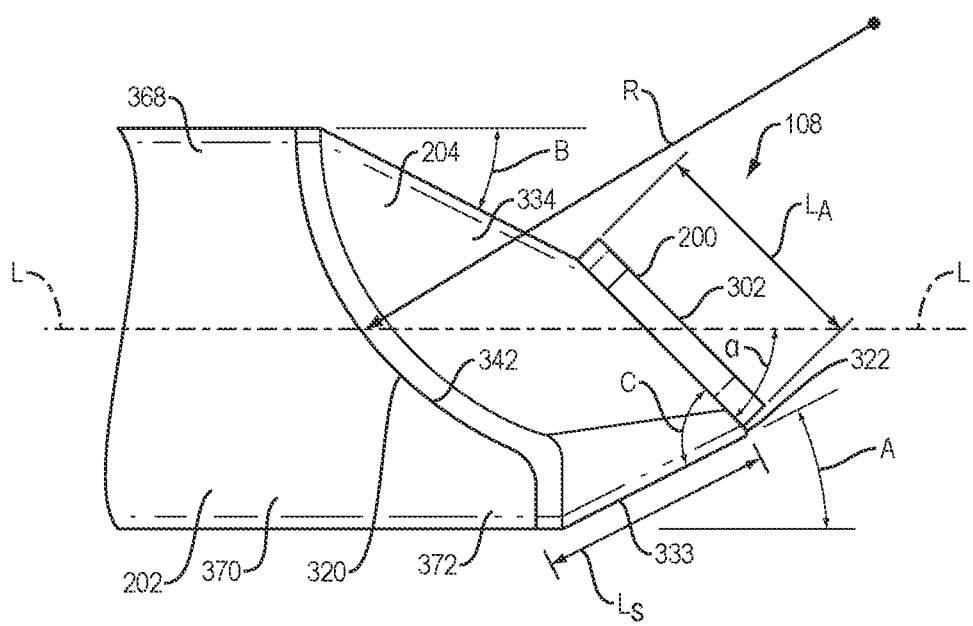
FIG. 3B illustrates a side view of the electrosurgical device in accordance with this disclosure.

Turning now to FIG. 3B, a side elevation of the distal end 108 is shown, including active electrode 200, insulating support member 204 and return electrode 202. Longitudinal axis L-L of the distal end 108 is shown. Distal end longitudinal axis may be angularly offset from a proximal end of the longitudinal axis along the device shaft 106 near the proximal end 111. Active electrode 200 intersects the longitudinal axis, but a central axis through the active electrode 200 is offset towards a lower or bottom side of device. More of the active electrode 200 is disposed below the longitudinal axis L-L. Active electrode 200 planar surface 302 is orientated at an angle α relative to a horizontal plane parallel to the longitudinal axis L-L. Angle α may be between 30-60 degrees (°), and is preferably around 45 degrees (°). The angle α in combination with the faceted surfaces of support member 204 are configured to orient the active electrode leading edge surface 303 in a targeted orientation.

FIG. 3B also illustrates the tapered support 204, including planar lower surface 333 and planar lower surface 334. Towards a proximal end, each of surfaces 333 and 334, 325a, 325b blend with the more cylindrical proximal end of support 204. Planar lower surface 333 tapers radially away from longitudinal axis as it extends proximally from surface 322. Planar lower surface extends at an angle A that may be between 10-25 degrees (°) and may more preferably be about 15-20 degrees (°). Planar upper surface 334 tapers radially away from longitudinal axis as it extends proximally from surface 322, at an angle B that may be larger than angle A. Angle B may be between 20-40 degrees) (°) and may more preferably be about 25-35 degrees (°). Return electrode 202 defines a distal edge surface 342 that defines a radius R, which may be between 3-4 mm. Angle A in combination with angle α defines an angle C that extends between two external surfaces of the spacer 204 adjacent the active electrode leading edge 303 and through the support 204. Angle C is between 55-70 degrees and preferably between 60-65 degrees, configured to orient the active electrode leading edge 303 and planar surface 302 in a target orientation during dissection of the acetabulum, as will be explained in more detail later.

The spacer 204 provides an electrically non-conductive area between the active electrode 200 and return electrode 202. The spacer 204 includes contoured and faceted surfaces that blend between the edges of the active electrode 200 and the cylindrical shape of the return electrode 202. The planar surfaces such as surfaces 333, 334 or 335a, 335b provide an inert planar surface that may rest against underlying adjacent tissue to help orient the active electrode 200 for tissue dissection. Being planar across its extent provides a surface that stabilizes the orientation of the device distal end 108. Consider relative art devices that define a curved outer surface for example, such as a tubular electrode support. In these relative art devices, resting a curved surface on the underlying tissue provides no lateral stabilization and the related art device may rotate freely about its axis as the surgeon moves the device. Maintaining a target orientation therefore relies more on surgeon skill. In comparison, by resting a planar surface of the support of the device 102 on the underlying tissue, the surgeon can reliably place a leading edge 303 of electrode on a target tissue and dissect that tissue. The planar surfaces provide a reference surface for the surgeon.

In addition, the planar surface of support 204 provides an inert or non-conductive area of the device. This is at least partly due to the spacer length, or the distance between the active electrode 200 and return 202, such as $L_s$. This length is considerably longer than related art devices, and defines a length sufficiently long such that tissue on which the spacer 204 is resting is minimally altering by the electrosurgical energy being delivered. A surgeon may therefore rest a planar surface of the support 204 corresponding the electrode edge of choice (303, 304, 305a, 305b) on tissue, using it as a guiding and stabilizing surface, while having less cause for concern of inadvertent tissue effect on the underlying tissue. For example, a device with a maximum shaft diameter or width that is approximately 5 mm, and an active electrode with a major length $L_A$ that is between 2-3 mm, linear length $L_s$ may be at least 2 mm long, is preferably at least 3 mm long, and may be up to 5 mm long. Linear length $L_s$ of spacer 204 may be at least as long as a major length of active electrode $L_A$. Linear length $L_s$ of support 204 may be more than half as long as a maximum diameter or width of the shaft. Linear length $L_s$ is sufficiently long such that tissue in contact along linear length $L_s$ is preferably shielded from inadvertent tissue treatment.

Still referring to FIG. 3B, in the example device 102 shown, the return electrode 202 has a top side 368 and a bottom side 370 adjacent the active electrode leading edge 333 and opposite the top side 368. The top side 368 of the return electrode 202 has a first length measured axially from the handle and the bottom side 370 has a second length measured axially from the handle 110 being greater than the first length to define a notched bottom portion of return electrode 202. Spacer 204 telescopes within the return electrode 202 and resides within the notch 372. As shown, no portion of the return electrode 200 axially overlaps the active electrode 200 when measured or considered along the longitudinal axis L-L. While a combination of lengths and angles space the return and active from each other to eliminate the overlap, the increased length of the support 204 is configured to space the active and return electrodes sufficiently to eliminate this overlap.

Figure 3C:
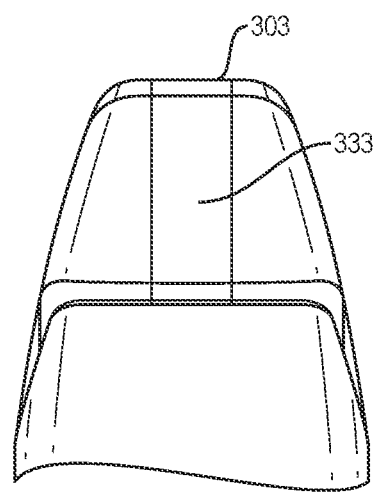
FIG. 3C illustrates a bottom view of the electrosurgical device in accordance with this disclosure.

FIG. 3C illustrates a bottom view of device distal end 108. This view may be a view a surgeon may have when the device is in an orientation for debulking a larger surface area of tissue. In this orientation, a substantial portion of the planar surface 302 may be placed in contact with tissue. Spacer planar surface 333 is shown and advantageously leading edge 303 can be viewed. Visibility of the active electrode 200 is preferable during all treatments to make sure treatment is in the targeted portion of tissue. Tapered support 204 is tapered so that active electrode 200 is visible from all sides of the electrode 200. The device may also be used to debullk tissue or coagulate tissue in this orientation relative to tissue. This may be used to remove a portion of a top surface of the acetabulum before placing hardware therein for example.

Figure 3D:
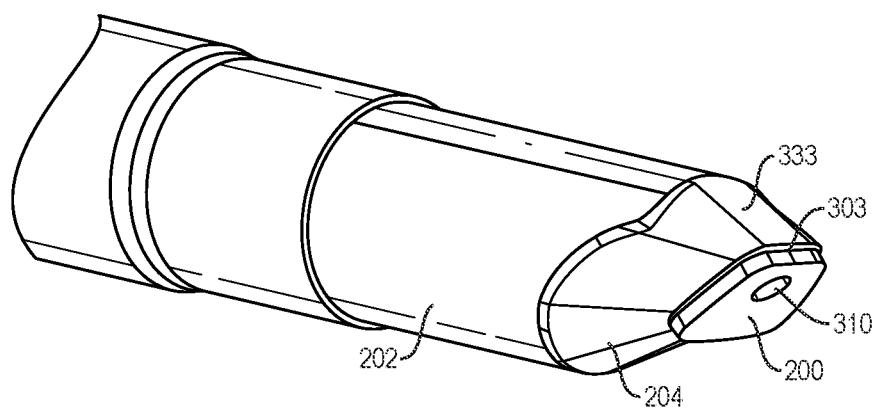
FIG. 3D illustrates an alternative perspective view of the electrosurgical device in accordance with this disclosure.

FIG. 3D illustrates an alternative view of the distal end 108, showing the tapered and multifaceted spacer 204. Planar surface 333 is also shown, relative to the leading edge 303.

Figure 4A:
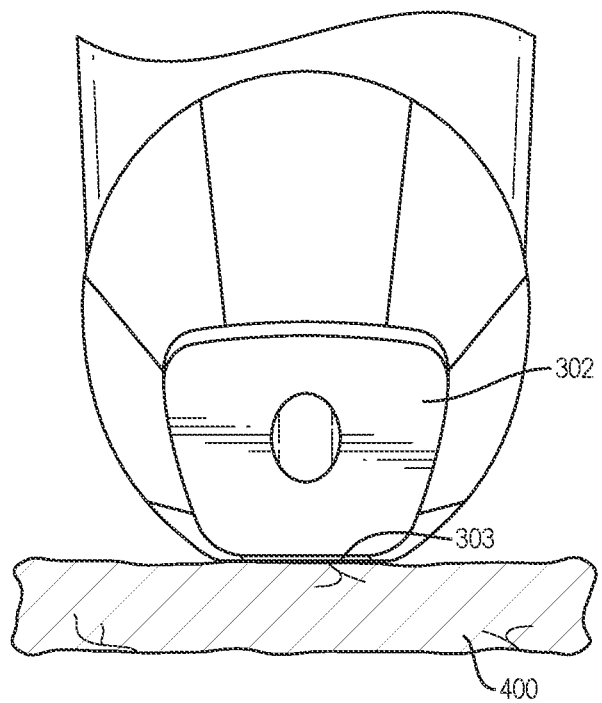
FIG. 4A illustrates a method of treating tissue with the electrosurgical device in accordance with this disclosure.

FIG. 4A illustrates a front view of the device distal end 108, with the device in a first orientation relative to tissue; the lower planar surface 333 resting on underlying tissue 400. This orientation may dissect the tissue at leading edge 303. Lower planar surface 333 defines a broad flat surface for stable contact with tissue. Resting the lower planar surface 333 on the tissue 400 orients the leading edge 303 on or directly adjacent the tissue 400 to finely dissect the tissue. In this example, the surface 302 is preferably distanced or angled away from any adjacent tissues.

Figure 4B:
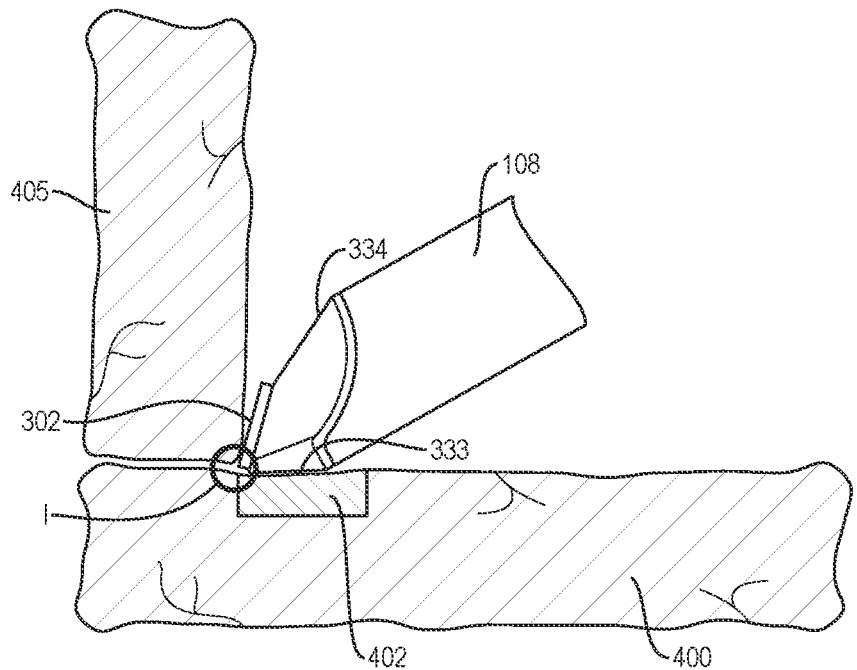
FIG. 4B illustrates a method of dissecting tissue with the electrosurgical device in accordance with this disclosure.

This is particularly pertinent for dissecting a first tissue 400 from a second tissue 405 as shown in FIG. 4B. This is a side view. By resting surface 333 on surface of tissue 400, the device is stably oriented to place leading edge 303 at intersection "I" between tissue 400 and 405. This may also preferably orient active electrode surface 302 away from tissue 405. In addition, inert surface 333 preferably protects tissue in zone 402 from being electrosurgically treated.

Tissue 405 may be capsule tissue within a hip joint and tissue 400 may be hip acetabulum. Device distal end is configured to dissect the capsule from the hip acetabulum which preserving adjacent tissues. By limiting the tissue effect to the intersection zone "I", capsular tissue loss may be minimized. In other examples, tissues may be the labrum and acetabulum of the hip.

One skilled in the art will realize the disclosure may be embodied in other specific forms without departing from the spirit or essential characteristics thereof. The foregoing examples are therefore to be considered in all respects illustrative rather than limiting of the disclosure described herein. Scope of the disclosure is thus indicated by the appended claims, rather than by the foregoing description, and all changes that come within the meaning and range of equivalency of the claims are therefore intended to be embraced therein.

What is claimed is:

1. An electrosurgical device, comprising: a handle at a proximal end of the device, an elongate shaft extending distally from the handle defining a longitudinal axis and a distal end, the distal end having a return electrode, an active electrode and an electrically insulative spacer axially separating the return and active electrode; wherein the active electrode resides along a single plane and defines a planar surface that is distal facing with a lateral width, the planar surface angled relative to the longitudinal axis to define a linear leading edge of the active electrode that has a lateral extent that extends across a majority of the lateral width and defines a distal-most edge of the electrosurgical device; wherein the insulative spacer is asymmetrically tapered between the return electrode and active electrode and defines a first planar surface that extends along and at an incline to the longitudinal axis and also extends across an extent of the insulative spacer on a first side of the longitudinal axis, the active electrode linear leading edge also located on the longitudinal axis first side.

2. The electrosurgical device of claim 1 wherein the active electrode planar surface defines a planar surface length extending from the leading edge to an opposing rear edge, and the first planar surface of the insulative spacer has a first length extending from the return electrode to a leading edge of the insulative spacer, the first length at least as long as the planar surface length of the active electrode, configured to shield any tissue in contact with the first planar surface from inadvertent tissue treatment.

3. The electrosurgical device of claim 1 wherein the planar surface of the active electrode is oriented at an acute angle relative to the first planar surface of the spacer, the acute angle extending through the spacer.

4. The electrosurgical device of claim 1 wherein the first planar surface has a lateral width that extends along the linear leading edge lateral extent and is configured to guide stably and broadly contact an adjacent tissue and place the active electrode leading edge onto a first tissue, while angling a remaining portion of the planar surface of the active electrode away from the first tissue.

5. The electrosurgical device of claim 1 wherein the insulative spacer defines a second planar surface, on an opposite side of the longitudinal axis to the first planar surface, the second planar surface axially longer than the first planar surface.

6. The electrosurgical device of claim 1 wherein the insulative spacer defines a multi-faceted outer surface, including at least the first planar surface, a second planar surface and a plurality of curved surfaces separating the first and second planar surfaces, the second planar surface having a lateral width that extends across a majority of the lateral width.

7. The electrosurgical device of claim 1 wherein the insulative spacer is asymmetrically tapered between the first side and an opposing second side of the insulative spacer, the opposing second side having a greater taper angle than the first side.

8. The electrosurgical device of claim 1 wherein the active electrode planar surface defines a trapezoidal shaped boundary.

9. The electrosurgical device of claim 8 wherein the spacer defines a distal-most surface that is congruent with the active electrode planar surface.

10. An electrosurgical device, comprising:
a handle at a proximal end, an elongate shaft extending distally from the handle along a longitudinal axis and a distal end having a tubular return electrode, an active electrode and an electrically insulative spacer axially separating the return and active electrode;
wherein the active electrode defines a planar surface that is distal facing, the planar surface angled relative to the longitudinal axis to define a leading edge of the active electrode defining a distal-most edge of the distal end;
wherein the insulative spacer is tapered between the return electrode and active electrode and defines a first planar surface that extends from a leading edge of the insulative spacer directly adjacent the leading edge of the active electrode, proximally along the longitudinal axis and also extends laterally across the insulative spacer, the first planar surface configured to engage a first tissue and stabilize an orientation of the leading edge of the active electrode relative to a target tissue,
wherein the first planar surface of the insulative spacer has a linear length extending along the longitudinal axis from the return electrode to a distal-most edge of the insulative spacer, the linear length extending more than half a diameter of the shaft, to shield the first tissue engaged by the first planar surface from inadvertent tissue treatment while electrosurgical energy is applied to the target tissue at the active electrode.

11. The electrosurgical device of claim 10 wherein the active electrode defines a lateral width and the first planar surface of the insulative spacer has a lateral width that extends across a majority of the active electrode lateral width.

12. The electrosurgical device of claim 10 wherein the planar surface of the active electrode is oriented at an acute angle relative to the first planar surface of the spacer, the acute angle extending through the spacer.

13. The electrosurgical device of claim 10 wherein the insulative spacer defines a second planar surface, on an opposite side of the electrosurgical device to the first planar surface, the second planar surface axially longer than the first planar surface and extending at an incline relative to the longitudinal axis and extending across a majority of a radius of the tubular return electrode.

14. The electrosurgical device of claim 10 wherein the insulative spacer defines a multi-faceted outer surface, including at least the first planar surface and a second planar surface.

15. The electrosurgical device of claim 10 wherein the insulative spacer is asymmetrically tapered between a first side and an opposing second side of the insulative spacer, the opposing second side having a greater angle of taper than the first side.

16. The electrosurgical device of claim 10 wherein the active electrode planar surface defines a trapezoidal shaped boundary.

17. The electrosurgical device of claim 16 wherein the insulative spacer defines a distal-most surface that is distal facing and congruent with the active electrode planar surface.

18. A method of treating a target tissue with an electrosurgical device, the electrosurgical device having a longitudinal axis, an active electrode oriented at an incline to the longitudinal axis, an insulative spacer and a return electrode, the method comprising: engaging a substantial portion of a planar surface of the insulative spacer of the electrosurgical device on a first tissue, to locate a leading edge of the active electrode adjacent the target tissue with a proximal portion of the active electrode spaced away from the target tissue, the planar surface extending proximally from active electrode at an incline to the longitudinal axis and having a lateral planar width that is at least half of a maximum lateral width of the active electrode; moving the active electrode of the device towards the target tissue while maintaining engagement of the planar surface on the first tissue, the planar surface oriented relative to the active electrode to preferentially place the active electrode leading edge on the target tissue, while angling a planar surface of the active electrode away from the target tissue, the leading edge defining a distal-most edge of the electrosurgical device; and moving the leading edge of the active electrode along the target tissue while applying electrosurgical energy to treat the target tissue while maintaining engagement of the planar surface of the insulative spacer on the first tissue.

19. The method of claim 18 wherein the planar surface of the insulative spacer has a length that defines an inert side of the device, and wherein moving the leading edge of the active electrode along the target tissue while applying electrosurgical energy treats the target tissue while shielding the first tissue from the electrosurgical energy.

20. The method of claim 18 further comprising adjusting the orientation of the device to engage the planar surface of the active electrode with a second tissue while viewing a rear edge surface of the active electrode; and applying electrosurgical energy to debulk the second tissue, the insulative spacer defining a tapered surface extending from a rear edge surface of the active electrode, the tapered surface configured to provide visibility of the rear edge surface while the debulking the second tissue.

* * * * *